US008245140B2

(12) United States Patent  (10) Patent No.: US 8,245,140 B2
Barber et al.  (45) Date of Patent: Aug. 14, 2012

(54) VISUALIZATION AND CONSOLIDATION OF VIRTUAL MACHINES IN A VIRTUALIZED DATA CENTER

(75) Inventors: Keith Barber, Durham, NC (US); Adam J. Friedlander, Poughkeepsie, NY (US); Robert Hagan, Durham, NC (US); David L. Kaminsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 12/650,629

(22) Filed: Dec. 31, 2009

(65) Prior Publication Data
US 2011/0161851 A1 Jun. 30, 2011

(51) Int. Cl.
G06F 15/177 (2006.01)
(52) U.S. Cl. ........ 715/735; 715/734; 715/736; 715/769; 715/771; 345/440; 718/1; 718/104; 718/105
(58) Field of Classification Search .................... 715/735
See application file for complete search history.

(56) References Cited

U.S. PATENT DOCUMENTS

| | | | |
|---|---|---|---|
| 7,831,820 B2* | 11/2010 | Winner et al. ...................... 713/1 |
| 7,941,510 B1* | 5/2011 | Tormasov et al. ............ 709/220 |
| 8,122,116 B2* | 2/2012 | Matsunaga et al. ........... 709/223 |
| 2005/0251802 A1* | 11/2005 | Bozek et al. ...................... 718/1 |
| 2006/0069761 A1* | 3/2006 | Singh et al. .................... 709/222 |
| 2009/0030971 A1* | 1/2009 | Trivedi et al. ................. 709/203 |
| 2009/0150639 A1* | 6/2009 | Ohata ............................ 711/172 |
| 2009/0300173 A1* | 12/2009 | Bakman et al. ................ 709/224 |
| 2010/0250734 A1* | 9/2010 | Ajiro ............................. 709/224 |
| 2010/0274890 A1* | 10/2010 | Patel et al. .................... 709/224 |
| 2010/0306381 A1* | 12/2010 | Lublin et al. .................. 709/226 |
| 2011/0022812 A1* | 1/2011 | van der Linden et al. .... 711/163 |

OTHER PUBLICATIONS

VMware, "VMware VirtualCenter User's Manual," Copyright 2006, VMware, Inc., Version 1.4, pp. 1-508.*

* cited by examiner

*Primary Examiner* — Alvin Tan
(74) *Attorney, Agent, or Firm* — Steven M. Greenberg, Esq.; Carey, Rodriguez, Greenberg & O'Keefe

(57) ABSTRACT

A method for visualizing and simulating server consolidation of different virtual machines in a virtualized data center can include identifying different server computers in a virtualized data center, computing load metrics for each of the server computers, and rendering a graph of the computed load metrics for the server computers in a graphical user interface (GUI) in a host computer. The method further can include selecting a source one of the server computers and also a target one of the server computers and further selecting a virtual machine for prospective migration from the source one of the server computers to the target one of the server computers. Yet further, the method can include further computing prospective load metrics for the source and the target resulting from the prospective migration of the virtual machine to the target. Finally, the method can include displaying in the GUI respective graphs of the prospective load metrics for each of the source and the target.

15 Claims, 2 Drawing Sheets

VISUALIZATION AND CONSOLIDATION OF VIRTUAL MACHINES IN A VIRTUALIZED DATA CENTER

BACKGROUND OF THE INVENTION

1. Field of the Invention

The present invention relates to monitoring systems in general and more particularly to performance visualization in consolidating virtual machines in a virtualized data center.

2. Description of the Related Art

Monitoring systems detect and respond to operational problems, oftentimes before the end user becomes aware of those problems. Consequently, monitoring systems have become a common requirement, especially for revenue-generating production environments. Most administrators understand the need for monitoring systems. Infrastructure teams, in fact, typically monitor the basic health of application servers by keeping an eye on central processing unit (CPU) utilization, throughput, memory usage and the like. However, there are many parts to an application server environment, and understanding which metrics to monitor for each of these pieces differentiates the environments that can effectively anticipate production problems from those that might get overwhelmed by them.

When applied in an appropriate context, systems monitoring is more than just the data that shows how an enterprise system performs technically. Load balancing metrics such as CPU utilization, method response times and power consumption can be inspected to determine when one server has been overly taxed while another inefficiently underutilized. Load metrics analysis can be even more important given the advent of the virtualized data center.

The traditional data center includes a multiplicity of server computers coupled to one another communicatively over a computer communications network. Applications execute in the different server computers. Applications further can execute redundantly in the server computers in a load-balanced arrangement with a sprayer directing requests to different ones of the redundant server computers. Data center managers through systems monitoring monitor the load metrics on a given server computer to perform rebalancing of the different server computers. By comparison, in a virtualized data center, multiple virtual servers co-exist in a single server computer. Optionally, different server computers each can host one or more virtual servers. Through such an arrangement, tremendous reductions in total cost of ownership of a data center have been achieved. Other advantages include the ability to persist the state of an entire virtual server in disk storage for transportability in batch or real time to a different server computer. Consequently, server migration and server failover can be achieved with ease.

Monitoring systems for virtualized data centers have proven to be less effective than when applied to a traditional data center of different server computers. In this regard, while monitoring systems for traditional data centers measure the performance of a server computer in terms of load metrics experienced through the execution of one or more applications therein, in a virtualized environment a clear correlation between executing applications and the underlying load metrics cannot be established due to the intermediary virtual machines. Yet, monitoring systems can in fact monitor load metrics for a virtual machine. However, in the virtualized environment, a prospective rebalancing of virtual machines in different server computers cannot be readily visualized when considering a consolidation of different virtual machines in a single server computer.

BRIEF SUMMARY OF THE INVENTION

Embodiments of the present invention address deficiencies of the art in respect to monitoring systems for the virtualized environment and provide a novel and non-obvious method, system and computer program product for visualizing and simulating consolidation of servers in a virtualized data center. In an embodiment of the invention, a method for visualizing and simulating server consolidation of different virtual machines in a virtualized data center can include identifying different server computers in a virtualized data center, computing load metrics for each of the server computers, and rendering a graph of the computed load metrics for the server computers in a graphical user interface (GUI) in a host computer.

The method further can include selecting a source one of the server computers and also a target one of the server computers and further selecting a virtual machine for prospective migration from the source one of the server computers to the target one of the server computers. Yet further, the method can include further computing prospective load metrics for the source one of the server computers and the target one of the server computers resulting from the prospective migration of the virtual machine to the target one of the server computers. Finally, the method can include displaying in the GUI respective graphs of the prospective load metrics for each of the source one of the server computers and the target one of the server computers.

In another embodiment of the invention, a monitoring data processing system can be provided. The system can include a host computer with processor and memory, and a monitoring system executing in the host computer and monitoring load metrics for different server computers in a virtualized data center communicatively coupled to the host computer. The system also can include visualization and simulation module coupled to the monitoring system. The module can include program code for computing load metrics for each of the server computers, rendering a graph of the computed load metrics for the server computers in a GUI in the host computer. For example, the load metrics can include CPU utilization and a load trend.

The program code of the module also can be enabled to select a source one of the server computers and also a target one of the server computers and to further select a virtual machine for prospective migration from the source one of the server computers to the target one of the server computers. Even further, the program code of the module can be enabled to further compute prospective load metrics for the source one of the server computers and the target one of the server computers resulting from the prospective migration of the virtual machine to the target one of the server computers. Finally, the program code of the module can be enabled to display in the GUI respective graphs of the prospective load metrics for each of the source one of the server computers and the target one of the server computers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for visualizing and simulating server consolidation of different virtual machines in a virtualized data center. In accordance with an embodiment of the invention, at least one source server computer and at least one target server computer can be selected through a graphical user interface (GUI) of a monitoring system for a virtualized data center. In response, dual panes can be displayed in the GUI, one for each of the source server computer and the target server computer, each pane displaying a graph of computed load metrics for the source server computer and the target server computer. Alternatively, a single pane can be provided to display both graphs for the computed load metrics for both the source server computer and the target server computer, using different coloring, shading, fill, line color or line style to differentiate between the source server computer and the target server computer in the single pane. At least one virtual machine executing in the source server computer can be selected for migration to the target server computer. Subsequently, the prospective load metrics for the source server computer and target server computer can be computed and displayed respectively in the panes. In this way, the impact of migrating the virtual machine from the source server computer to the target server computer can be visualized in the GUI.

Figure 1:
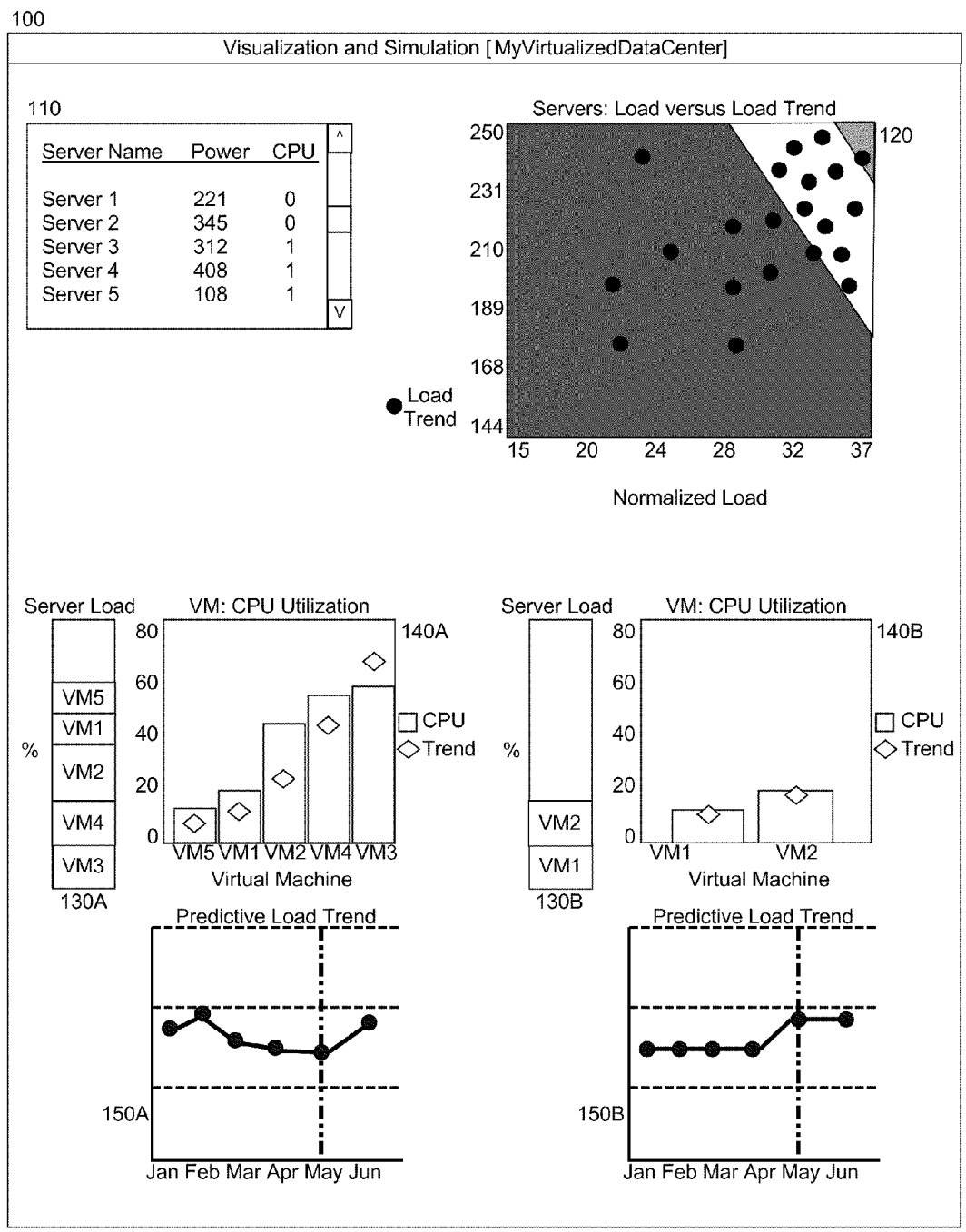
FIG. 1 is pictorial illustration of a graphical user interface (GUI) for visualizing and simulating server consolidation of different virtual machines in a virtualized data center.

In further illustration, FIG. 1 pictorially shows a graphical user interface (GUI) for visualizing and simulating server consolidation of different virtual machines in a virtualized data center. As shown in FIG. 1, a GUI 100 can be provided for visualizing load metrics in a virtualized data center and for visualizing a simulation of a migration of one or more virtual machines within the virtualized data center. The GUI 100 can include a graphical view of the virtualized data center 120, for example a scatter plot visualizing a normalized load of each server computer in the virtualized data center with respect to a load trend meaning a scalar trend of measured loads for each server computer. The GUI 100 also can include a selection box 110 through which different server computers monitored in the graphical view of the virtualized data center 120 can be selected for more detailed analysis. Of note, each icon representative of a server computer in the virtualized data center in the exemplary scatter plot can be activatable such that a server computer can be selected for more detailed analysis through the scatter plot.

Dual server load consumption gauges 130A, 130B can be provided in the GUI 100. Each of the gauges 130A, 130B can specify a portion of server load of a server computer by a virtual machine operating in the server computer. To this end, one of the gauges 130A can visualize the portion of server load consumption for a selected source server computer from which one or more virtual machines are to be migrated, while the other of the gauges 130B can visualize the portion of server load consumption for a selected target server computer to which one or more virtual machines are to be migrated. Additionally, dual CPU utilization graphs 140A, 140B can be provided—one for each of the source server computer and the target server computer. Finally, predictive load trend graphs 150A, 150B can be provided for each of the source server computer and the target server computer.

Of note, load metrics can computed for a simulated migration of one or more virtual machines from the selected source server computer to the selected target server computer. In this regard, the iconic representation of each virtual machine in the gauge 130A, or the CPU utilization graph 140A can be enabled for dragging-and-dropping into the corresponding gauge 130B, or CPU utilization graph 140B for the target server computer to simulate the prospective migration of the dragged-and-dropped virtual machine from the source server computer to the target server computer.

The simulation can include a prospective computation of load metrics for the target server computer (and optionally the source server computer sans the migrated virtual machine or machines) by accounting for the contemporaneously known load trend in the source server computer for each migrated virtual machine and the known load imparted by each migrated virtual machine upon the source server computer. In this regard, the load trend the load trend can reflect a trend of CPU utilization for each server computer in the virtualized data center based upon observed changes in CPU utilization for each of the server computers. The resulting prospective load metrics of the target server computer can be reflected in the gauge 130B, CPU utilization graph 140B and predictive load trend graph 150B. Optionally, the resulting prospective load metrics of the source server computer can be reflected in the gauge 130A, CPU utilization graph 140A and predictive load trend graph 150A. In this way, the impact of a simulated migration of virtual machines in a virtualized data center can be readily visualized.

Figure 2:
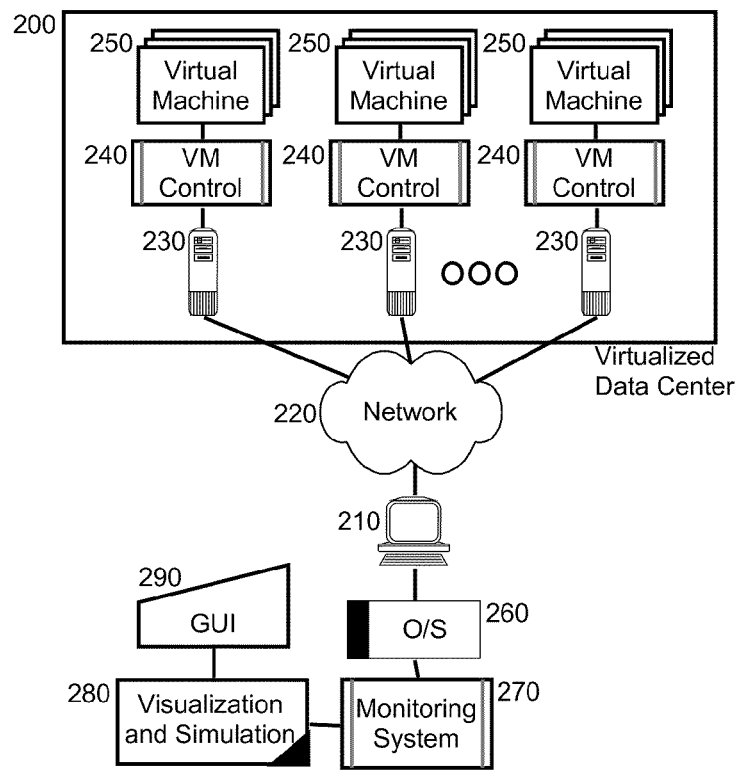
FIG. 2 is a schematic illustration of a monitoring data processing system configured for visualizing and simulating server consolidation of different virtual machines in a virtualized data center; and, FIG. 3 is a flow chart illustrating a process for visualizing and simulating server consolidation of different virtual machines in a virtualized data center.

The process described in connection with FIG. 1 can be implemented in a monitoring data processing system. In yet further illustration, FIG. 2 schematically shows a monitoring data processing system configured for visualizing and simulating server consolidation of different virtual machines in a virtualized data center. The system can include a host computer 210 with at least one processor and memory. The host computer 210 can be configured for communicative coupling to a virtualized data center 200 over a computer communications network 220. The virtualized data center 200 can include one or more server computers 230, each with a virtual machine control application 240 controlling the co-existence of different virtual machines 250 accessing the resources of the server computers, including fixed storage, communications channels, memory and processor utilization.

The host computer 210 can include an operating system 260 executing by one or more of the processors in the memory of the host computer 210. A monitoring system 270, in turn, can be hosted by the operating system 260. The monitoring system 270 can include functionality sufficient to acquire load metrics for the different server computers 230 in the virtualized data center 200, including CPU utilization attributable to individual ones of the virtual machines 250 in respective ones of the server computers 230. Other metrics acquirable by the monitoring system 270 include power consumption by the different server computers 230 and an overall load experienced by the different server computers 230.

Notably, a visualization and simulation module 280 can be coupled to the monitoring system 270 and can execute in the memory by one or more of the processors of the host computer 210. The module 280 can include program code enabled to render a GUI 290 visualizing the load metrics experienced by each of the server computers 230 in the virtualized data center 200. For instance, the program code can be enabled to render a scatterplot in the GUI 290 visualizing the load metrics. Additionally, the program code can be enabled to permit a selection through the GUI 290 of a source one of the server computers 230 and a target one of the server computers 230 to which one or more of the virtual machines 250 in the source one of the server computers 230 can be migrated. Finally, the program code can be enabled to compute predictive load metrics for the target one of the server computers 230 resulting from a proposed migration of one or more of the virtual machines 250 from the source one of the server computers 230 to the target one of the server computers 230.

Figure 3:
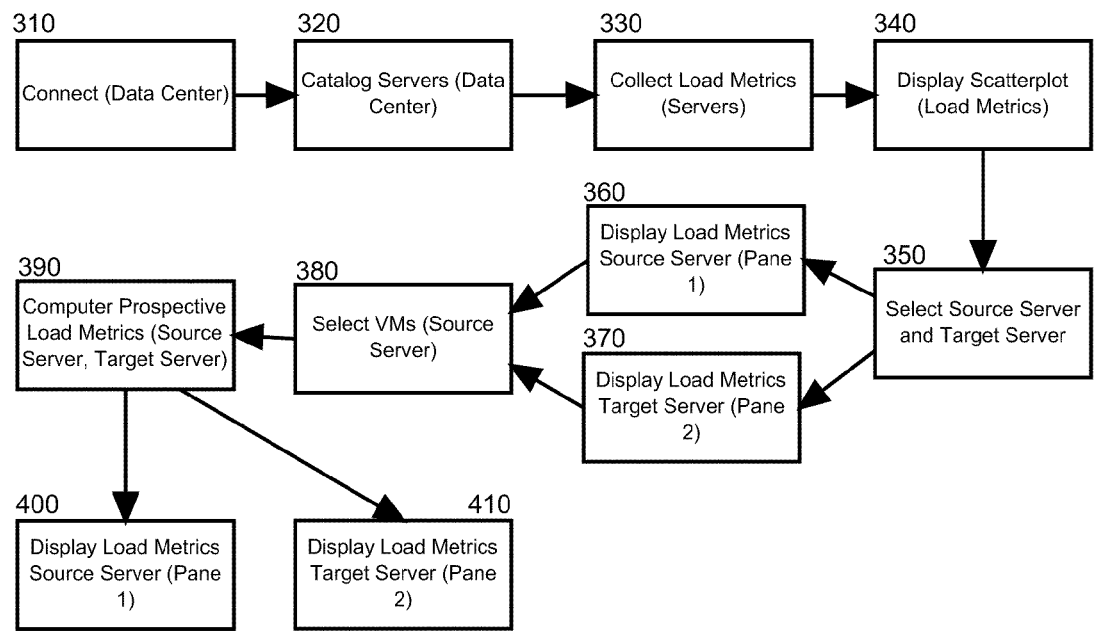

In even yet further illustration of the operation of the visualizaiton and simulation module 280, FIG. 3 is a flow chart illustrating a process for visualizing and simulating server consolidation of different virtual machines in a virtualized data center. Beginning in block 310, a communicative connection can be established with a virtualized data center. In block 320, a catalog of the different server computers in the virtualized data center can be determined and displayed in a GUI and in block 330, load metrics for each of the different server computers can be computed. In block 340, a scatterplot can be rendered showing server load compared to load trend for each of the server computers. A range of satisfactory performing server computers, unsatisfactory performing server computers and optimally performing server computers can be indicated by shading different regions of the scatterplot.

In block 350, both a source server computer and a target server computer can be selected from amongst those in the catalog, either through the scatterplot, or through a different user interface element in the GUI. In block 360, a first pane can be displayed in the GUI to include a detailed view of the load metrics for the source server computer. Likewise, in block 370, a second pane can be displayed in the GUI to include a detailed view of the load metrics for the target server computer. Thereafter, in block 380 at least one virtual machine in the source server computer can be selected for migration to the target server computer. Subsequently, in block 390 prospective load metrics can be computed for the target server computer, and optionally the source server computer by combining the load trends for the selected virtual machine or virtual machines with a known load imparted by the selected virtual machine or virtual machines on the source server computer. Finally, in blocks 400 and 410, the first and second panes can be displayed in the GUI to include a detailed view of the prospective load metrics for the source server computer and target server computer. Optionally, the migration of the virtual machine or virtual machines can be directed through the GUI thereafter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for visualizing and simulating server consolidation of different virtual machines in a virtualized data center, the method comprising:
    identifying a plurality of server computers in a virtualized data center;
    computing load metrics for each of the server computers;
    rendering a graph of the computed load metrics for the server computers in a graphical user interface (GUI) in a host computer;
    selecting as a source one of the server computers and also as a target one of the server computers and further selecting a virtual machine from the source one of the server computers for prospective migration to the target one of the server computers;
    further computing prospective load metrics for the source one of the server computers and the target one of the server computers resulting from the prospective migration of the virtual machine to the target one of the server computers; and,
    displaying in the GUI respective graphs of the prospective load metrics for each of the source one of the server computers and the target one of the server computers.

2. The method of claim 1, wherein rendering a graph of the computed load metrics for the server computers in a graphical user interface (GUI) in a host computer, comprises rendering a scatterplot of the computed load metrics for the server computers in the GUI in the host computer.

3. The method of claim 2, wherein a first axis of the scatterplot represents a current state of the server computers and a second axis of the scatterplot represents a trend in changes of state of the server computers.

4. The method of claim 3 wherein the current state is current load experienced by the server computers and the trend in changes of state is a trend in changes in load experienced by the server computers.

5. The method of claim 4, wherein the trend in changes in load experienced by the server computers comprises a trend of CPU utilization for each of the server computers based upon observed changes in CPU utilization for each of the server computers.

6. The method of claim 1, wherein selecting a source one of the server computers and also a target one of the server computers and further selecting a virtual machine from the source one of the server computers for prospective migration to the target one of the server computers, comprises:
    displaying both a pane for the source one of the server computers with load metrics for each virtual machine in the source one of the server computers and also a pane for the target one of the server computers with load metrics for each virtual machine in the target one of the server computers; and,
    dragging an icon for a virtual machine in the source one of the server computers from the pane for the source one of the server computers to the pane for the target one of the server computers.

7. A monitoring data processing system comprising:
    a host computer with processor and memory;
    a monitoring system executing in the host computer and monitoring load metrics for a plurality of server computers in a virtualized data center communicatively coupled to the host computer; and,
    a visualization and simulation module coupled to the monitoring system, the module comprising program code for computing load metrics for each of the server computers, rendering a graph of the computed load metrics for the server computers in a graphical user interface (GUI) in the host computer, selecting a source one of the server computers and also a target one of the server computers and further selecting a virtual machine from the source one of the server computers for prospective migration to the target one of the server computers, further computing prospective load metrics for the source one of the server computers and the target one of the server computers resulting from the prospective migration of the virtual machine to the target one of the server computers, and displaying in the GUI respective graphs of the prospective load metrics for each of the source one of the server computers and the target one of the server computers.

8. The system of claim 7, wherein the computed load metrics comprise central processing unit (CPU) utilization.

9. The system of claim 8, wherein the computed load metrics further comprise a load trend.

10. A computer program product comprising a computer usable storage medium storing computer usable program code for visualizing and simulating server consolidation of different virtual machines in a virtualized data center, the computer program product comprising:
  computer usable program code for identifying a plurality of server computers in a virtualized data center;
  computer usable program code for computing load metrics for each of the server computers;
  computer usable program code for rendering a graph of the computed load metrics for the server computers in a graphical user interface (GUI) in a host computer;
  computer usable program code for selecting a source one of the server computers and also a target one of the server computers and further selecting a virtual machine from the source one of the server computers for prospective migration to the target one of the server computers;
  computer usable program code for further computing prospective load metrics for the source one of the server computers and the target one of the server computers resulting from the prospective migration of the virtual machine to the target one of the server computers; and,
  computer usable program code for displaying in the GUI respective graphs of the prospective load metrics for each of the source one of the server computers and the target one of the server computers.

11. The computer program product of claim 10, wherein the computer usable program code for rendering a graph of the computed load metrics for the server computers in a graphical user interface (GUI) in a host computer, comprises computer usable program code for rendering a scatterplot of the computed load metrics for the server computers in the GUI in the host computer.

12. The computer program product of claim 11, wherein a first axis of the scatterplot represents a current state of the server computers and a second axis of the scatterplot represents a trend in changes of state of the server computers.

13. The computer program product of claim 12, wherein the current state is current load experienced by the server computers and the trend in changes of state is a trend in changes in load experienced by the server computers.

14. The computer program product of claim 13, wherein the trend in changes in the load experienced by the server computers comprises a trend of CPU utilization for each of the server computers based upon observed changes in CPU utilization for each of the server computers.

15. The computer program product of claim 10, wherein selecting a source one of the server computers and also a target one of the server computers and further selecting a virtual machine from the source one of the server computers for prospective migration to the target one of the server computers, comprises:
  computer usable program code for displaying both a pane for the source one of the server computers with load metrics for each virtual machine in the source one of the server computers and also a pane for the target one of the server computers with load metrics for each virtual machine in the target one of the server computers; and,
  computer usable program code for dragging an icon for a virtual machine in the source one of the server computers from the pane for the source one of the server computers to the pane for the target one of the server computers.

* * * * *